US012605853B2

(12) United States Patent
Srivastava et al.

(10) Patent No.: US 12,605,853 B2
(45) Date of Patent: Apr. 21, 2026

(54) TELESCOPIC COLUMN ASSEMBLY IN A ROBOTIC ARM SYSTEM

(71) Applicant: SSI IP HOLDINGS INC., Fort Lauderdale, FL (US)

(72) Inventors: Sudhir Prem Srivastava, Gurugram (IN); Vishwajyoti Pascual Srivastava, Gurugram (IN); Anil Kumar Patidar, Gurugram (IN)

(73) Assignee: SSI IP HOLDINGS INC., Fort Lauderdale, FL (US)

( * ) Notice: Subject to any disclaimer, the term of this patent is extended or adjusted under 35 U.S.C. 154(b) by 304 days.

(21) Appl. No.: 18/280,255

(22) PCT Filed: Mar. 29, 2023

(86) PCT No.: PCT/IN2023/050299
§ 371 (c)(1),
(2) Date: Sep. 4, 2023

(87) PCT Pub. No.: WO2023/187825
PCT Pub. Date: Oct. 5, 2023

(65) Prior Publication Data
US 2025/0083338 A1     Mar. 13, 2025

(30) Foreign Application Priority Data
Mar. 29, 2022     (IN) ............................. 202211018354

(51) Int. Cl.
*F16M 11/00*     (2006.01)
*B25J 18/02*     (2006.01)

(52) U.S. Cl.
CPC .................................. *B25J 18/025* (2013.01)

(58) Field of Classification Search
CPC .......... B25J 18/025; A61B 2017/00991; A61B 34/30
See application file for complete search history.

(56) References Cited

U.S. PATENT DOCUMENTS

| | | | |
|---|---|---|---|
| 11,584,624 B1 * | 2/2023 | Christensen | B66F 3/44 |
| 2020/0313604 A1 * | 10/2020 | Harris | F16B 2/065 |
| 2024/0383107 A1 * | 11/2024 | Cotter | B25B 5/147 |

FOREIGN PATENT DOCUMENTS

| | | |
|---|---|---|
| CN | 108202322 B | 11/2020 |
| CN | 111972130 A | 11/2020 |

* cited by examiner

*Primary Examiner* — Amy J. Sterling
(74) *Attorney, Agent, or Firm* — SZDC Law PC

(57)     ABSTRACT
A telescopic column assembly (213) for docking of a robotic arm at variable height in a robotic assisted surgery is disclosed herein. The telescopic column assembly (213) may include a plurality of spring assemblies (321), a rack and pinion assembly (323), a position sensor (325), and a motor (449). The plurality of spring assemblies (321) may be a constant spring such as (401), (403), (405), (407). The plurality of spring (401), (403), (405), (407) are wrapped to a plurality of drums (417), (419), (421), (423) and other ends of the plurality of springs (401), (403), (405), (407) are secured to a horizontal profile (433*a*) of the support member (433). The support member (433) is configured to move in vertical directions which is facilitated by the spring assemblies (321), the rack and pinion assembly (323) and the motor (449), to variably adjust the height of the surgical instruments while docking.

7 Claims, 6 Drawing Sheets

213

TELESCOPIC COLUMN ASSEMBLY IN A ROBOTIC ARM SYSTEM

This application is the National Stage Application of PCT/IN2023/050299, filed on Mar. 29, 2023, which claims priority to Indian Patent Application number 202211018354, filed on Mar. 29, 2022, which is incorporated by reference for all purposes as if fully set forth herein.

TECHNICAL FIELD

The embodiments of the disclosure generally relate to a field of robotic surgical system. More particularly, the disclosure relates to a telescopic column assembly for assisting docking a robotic arm at a variable height.

BACKGROUND

This section is intended to introduce the reader to various aspects of art that may be related to various aspects of the present disclosure, which are described below. This disclosure is believed to be helpful in providing the reader with background information to facilitate a better understanding of the various aspects of the present disclosure. Accordingly, it should be understood that these statements are to be read in this light, and not just as an admissions of prior art.

Robotic assisted surgical systems have been adopted worldwide to gradually replace conventional surgical procedures such as open surgery and laparoscopic surgical procedures. The robotic assisted surgery offers various benefits to a patient during surgery and during post-surgery recovery time. The robotic assisted surgery equally offers numerous benefits to a surgeon in term of enhancing the surgeon ability to precisely perform surgery, less fatigue and a magnified clear 3D vision of the surgical site. Further, in a robotic assisted surgery, the surgeon typically operates with a hand controller/master controller/surgeon input device/joystick at a surgeon console system to seamlessly capture and transfer complex actions performed by him/her giving the perception that he/she himself/herself is directly articulating a surgical tools/surgical instrument to perform the surgery. The surgeon operating on the surgeon console system may be located at a distance from a surgical site or may be located within an operating theatre where the patient is being operated on.

The robotic assisted surgical systems may comprise multiple robotic arms aiding in conducting robotic assisted surgeries. The robotic assisted surgical system utilizes a sterile adapter/a sterile barrier to separate a non-sterile section of the multiple robotic arms from a mandatory sterile surgical tools/surgical instrument attached to one end of the multiple robotic arms. The sterile adaptor/sterile barrier may include a sterile plastic drape that envelops the multiple robotic arms and the sterile adaptor/sterile barrier that operably engages with the sterile surgical tools/surgical instrument in the sterile field.

Plurality of cannula is inserted into the patient body through which the surgical instruments and endoscope system are inserted to access the surgical site. The multiple robotic arms after being draped were brought close to the operating table for docking the arms to the respective cannula. The main challenge is that during the docking process, the robotic arm assembly is required to be adjusted laterally and longitudinally so that the individual arms can be docked precisely with the respective cannula.

Another challenge while docking the robotic arms with the respective cannula is that while docking it is of outmost importance that no unwanted force should be exerted on the patient body and further no unintended motion of the robotic arm assembly is desirable which may injure the patient lying on the operating table.

In the light of aforementioned challenges, there is a need for adjusting the height of the robotic arm assembly in a very controlled and precise manner so as to achieve a seamless docking of the robotic arms with the respective cannula.

SUMMARY

In one general aspect, a telescopic column assembly (213) comprising a housing (301), a dovetail clamp (305), a support member (303) and a mounting member (307). Further, the dovetail clamp (305) is a secured to one end of the support member (303) and other end of the dovetail clamp (305) is secured to one end of a set-up joint assembly (211).

In one general aspect, the telescopic column assembly (213) further comprising a plurality of spring (401), (403), (405), (407), a plurality of plurality of bracket (409), (411), (413), (415), plurality of drum (417), (419), (421), (423) rotatably coupled to the plurality of bracket (409), (411), (413), (415), a motor (449) secured to a vertical profile (433b), a rack (453) and a pinion (451), wherein the pinion (451) is operationally secured to one end of the motor (449) and the rack (453) is secured to a vertical profile (443b), a position sensor (325), wherein the position sensor (325) is secured to a position sensor shaft (327) and a brake (329), wherein the brake (329) is secured to a brake shaft (331).

In one general aspect, the bracket (409) comprises a recess (409a) (409b), the bracket (411) comprises a recess (411a) (411b), the bracket (413) comprises a recess (413a) (413b) and the bracket (415) comprises a recess (415a) (415b).

In one general aspect, one end of the plurality of springs (401), (403), (405), (407) is secured to the plurality of drum (417), (419), (421), (423) and other end of the plurality of springs (401), (403), (405), (407) is secured to a horizontal profile (433a).

In one general aspect, the plurality of springs (401), (403), (405) and (407) is configured to wrapped around the plurality of drum (417), (419), (421), (423) to facilitate movement of the telescopic column assembly (213) in upward and downward direction.

In one general aspect, the plurality of bracket assembly (409), (411), (413), (415) is secured to a horizontal profile (443a).

In one general aspect, the column assembly (213) further comprising a linear guide rail (507a), (507b), wherein one end of the linear guide rail (507a), (507b) is secured to a support member (503) and the other end of the linear guide rail (507a) and (507b) is secured to a support member (505) and a plurality of mounting bracket (509a), (509b), (509c), (509d) secured to one end of a support member (505).

BRIEF DESCRIPTION OF THE DRAWINGS

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings in which:

FIG. 2(*b*) illustrates a side view of the robotic cart assembly with wheels off the ground in accordance with an embodiment of the disclosure;

FIG. 2(*c*) illustrates a perspective view of the robotic cart assembly with extended boom assembly and setup joint assembly in accordance with an embodiment of the disclosure;

FIG. 3(*b*) illustrates a perspective view of the telescopic column assembly without a housing in accordance with an embodiment of the disclosure;

FIG. 4(*b*) illustrates another view of the spring assembly of the telescopic column assembly in accordance with an embodiment of the disclosure;

FIG. 4(*c*) illustrates an exploded view of the spring assembly of the telescopic column assembly in accordance with an embodiment of the disclosure;

FIG. 4(*d*) illustrates a rack and pinion assembly of the telescopic column assembly in accordance with an embodiment of the disclosure.

DETAILED DESCRIPTION OF DISCLOSURE

Figure 1:
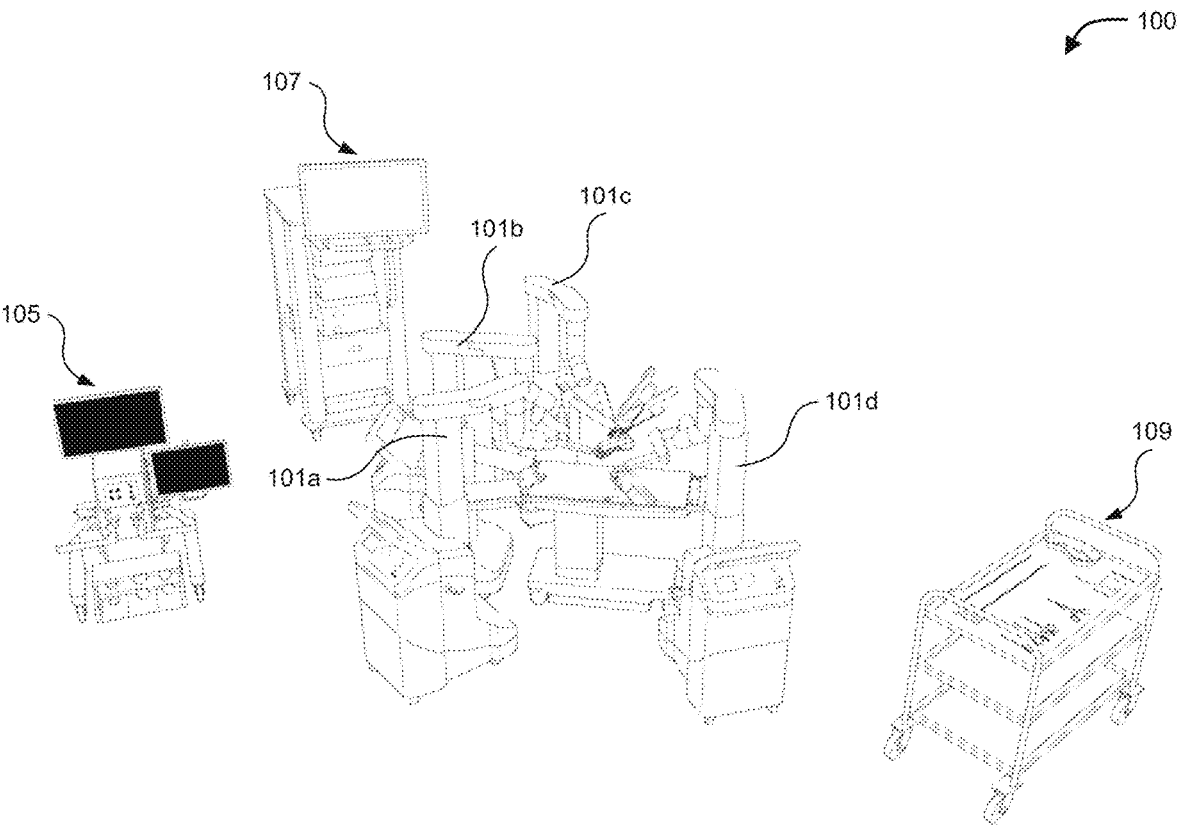
FIG. 1 illustrates an example implementation of a multi-arm teleoperated surgical system which can be used with one or more features in accordance with an embodiment of the disclosure.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment", "an implementation", "another implementation" or similar language means that a particular feature, structure, or characteristic described in connection with the embodiment is included in at least one embodiment of the present disclosure. Thus, appearances of the phrase "in an embodiment", "in another embodiment", "in one implementation", "in another implementation", and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Unless otherwise defined, all technical and scientific terms used herein have the same meaning as commonly understood by one of ordinary skill in the art to which this disclosure belongs. The apparatus, system, and examples provided herein are illustrative only and not intended to be limiting.

The terms "a" and "an" herein do not denote a limitation of quantity, but rather denote the presence of at least one of the referenced items. Further, the term "sterile barrier" and "sterile adapter", "surgical tool" and "surgical instrument" denotes the same meaning and may be used interchangeably throughout the description.

Embodiments of the disclosure will be described below in detail with reference to the accompanying drawings.

FIG. 1 illustrates an example implementation of a multi-arm teleoperated surgical system which can be used with one or more features in accordance with an embodiment of the disclosure. Specifically, FIG. 1 illustrates the multi arm teleoperated surgical system (100) having four robotic arms (101*a*), (101*b*), (101*c*), (101*d*) mounted on four robotic arm carts around an operating table (103). The four-robotic arms (101*a*), (101*b*), (101*c*), (101*d*) as depicted in FIG. 1 is for illustration purposes and the number of robotic arms may vary depending upon the type of surgery. The four robotic arms (101*a*), (101*b*), (101*c*), (101*d*) are arranged along the operating table (103) and may also be arranged in different manner but not limited to the robotic arms (101*a*), (101*b*), (101*c*), (101*d*) arranged along the operating table (103). The robotic arms (101*a*), (101*b*), (101*c*), (101*d*) may be separately mounted on the four robotic arm carts or the robotic arms (101*a*), (101*b*), (101*c*), (101*d*) mechanically and/or electronically connected with each other or the robotic arms (101*a*), (101*b*), (101*c*), (101*d*) connected to a central body (not shown) such that the robotic arms (101*a*), (101*b*), (101*c*), (101*d*) branch out of a central body (not shown). Further, the multi arm teleoperated surgical system (100) may include a console system (105), a vision cart (107), and a surgical instrument, accessory table (109).

As illustrated in FIG. 2(*a*), FIG. 2(*b*) and FIG. 2(*c*), the robotic cart assembly (200) may include a robotic cart (201), a base lift assembly (203*a*, 203*b*), a plurality of wheel (205), a hand steering assembly (207), a column assembly (209), a set-up joint assembly (211), a telescopic column assembly (213) and a parallelogram arm assembly (215). The base lift assembly (203*a*, 203*b*) is configured to move in vertical directions. The robotic cart assembly (200) needs to be stable so that the movement of the parallelogram arm assembly (215) during surgical procedures may not produce unwanted movement/vibrations to the robotic cart assembly (200).

In an embodiment, the robotic cart assembly (200) is on the wheels as illustrated in FIG. 2(*a*). The plurality of wheels (205) touching a ground may also be refereed as the grounded position of the robotic cart assembly (200) and the plurality of wheels (205) when not touching the ground may be referred as the ungrounded position of the robotic cart assembly (200). The plurality of wheels (205) may facilitate the robotic cart assembly (200) to move from one place to another. For example, during the surgical set-up, the robotic cart assembly (200) may require to be positioned around a surgical table (103) based on the surgical procedures (as shown in FIG. 1). Further, the cart assembly (200) may also require moving between different operation theaters. The base lift assembly (203a, 203b) facilitate the plurality of wheels (205) to be positioned in the grounded position and the ungrounded position of the robotic cart assembly (200).

According to an embodiment, an auto leveling mechanism is configured in which the robotic cart assembly (200) when placed on an uneven surface, automatically adjust to maintain its position evenly with respect to the uneven surface. A sensor (not shown) may be placed at a suitable position inside the robotic cart assembly (200) to detects whether the ground surface is even or not and accordingly, send command to trigger the auto levelling mechanism. When the robotic cart assembly (200) is placed on the ungrounded position in which the plurality of wheels (205) may be lifted up as the cart assembly (200) are on the base lift assembly (203a, 203b). When the sensor detects the unevenness of the ground surface, it sends signal to a control box (not shown) to adjust the position of the base lifting assembly (203a, 203b) to maintain the evenness of the robotic cart assembly (200) on an uneven surface.

Figures 2A, 2B:
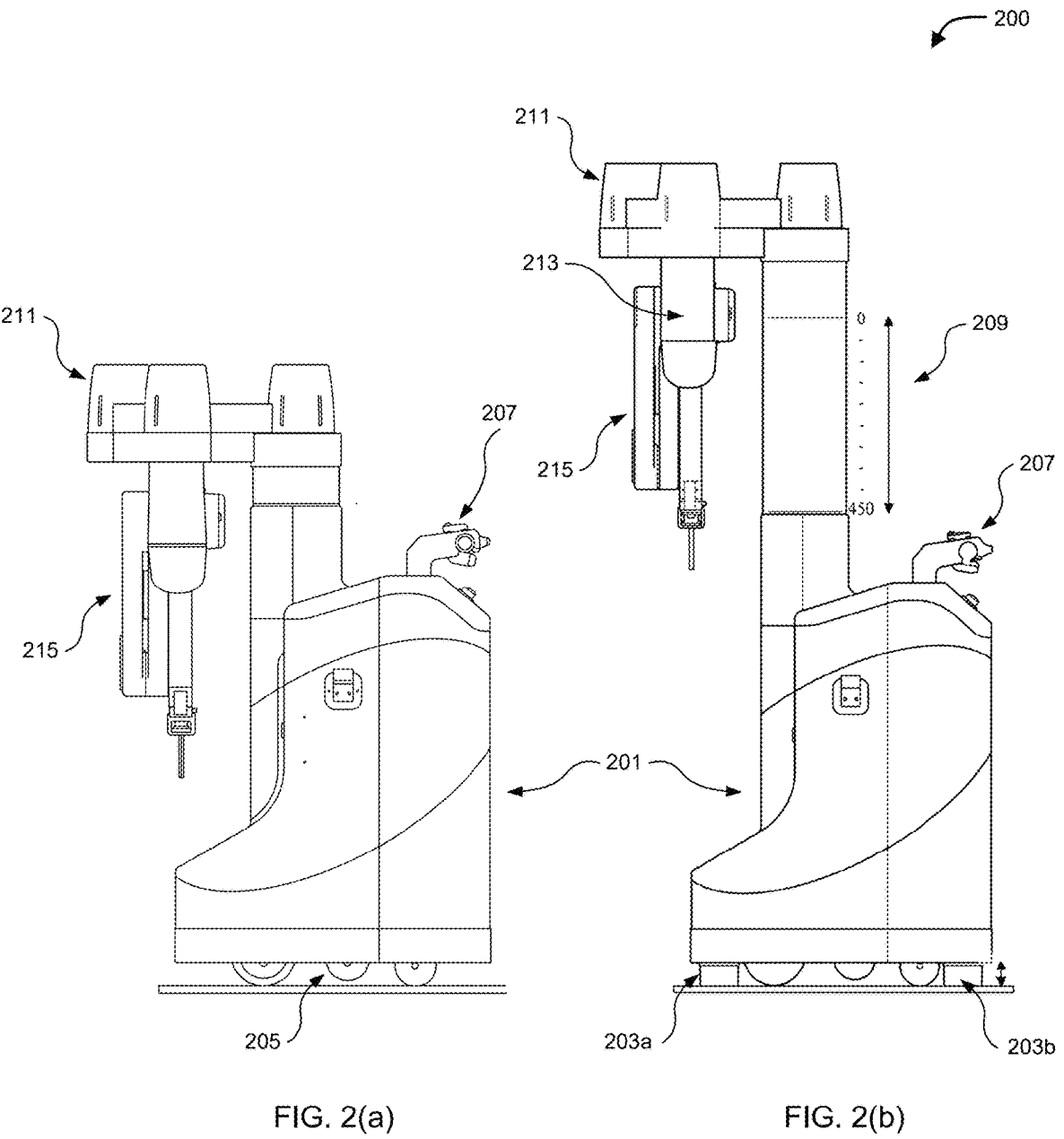
FIG. 2(*a*) illustrates a side view of an example robotic cart assembly with wheels on ground in accordance with an embodiment of the disclosure.
Figure 2C:
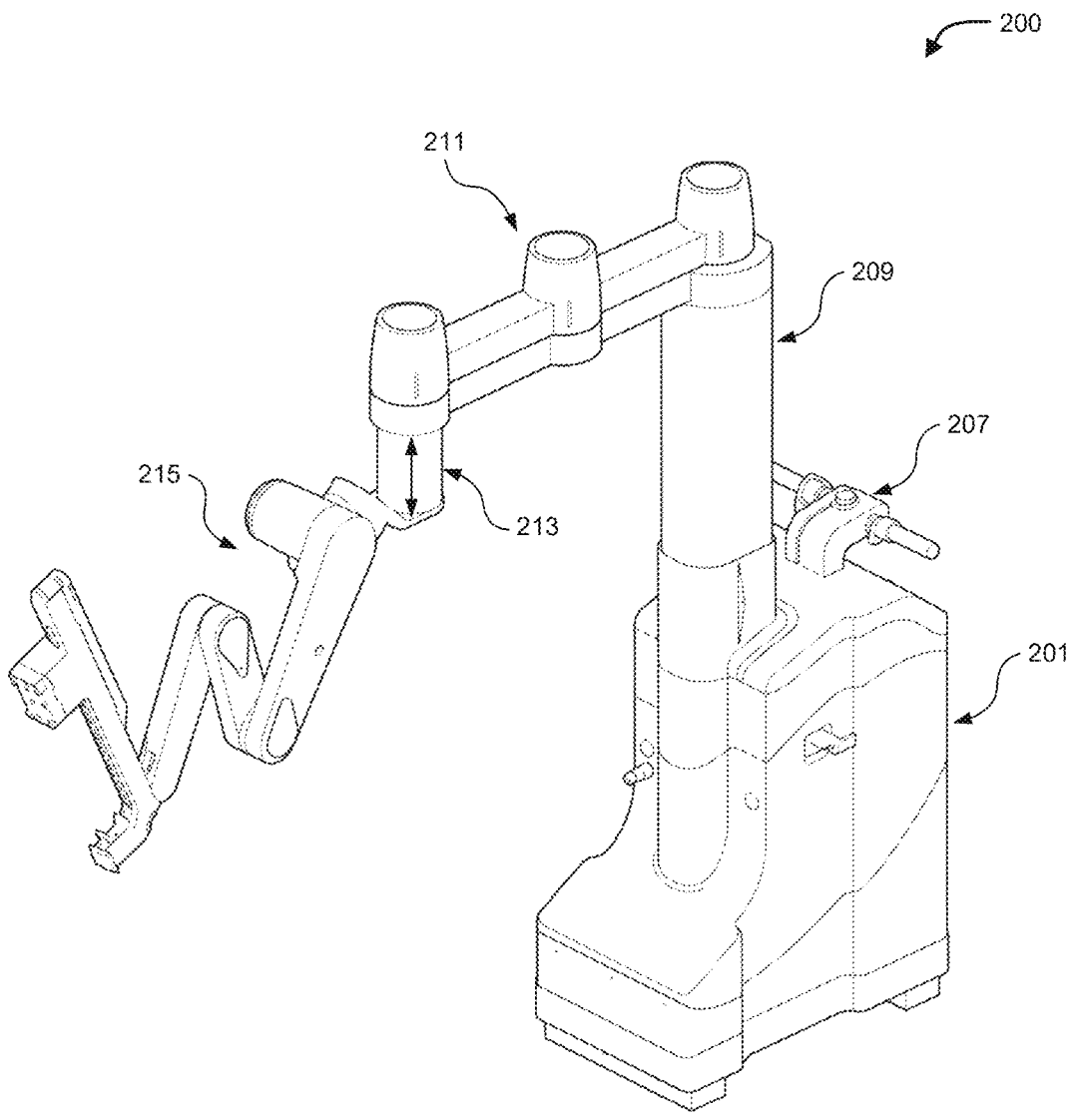

As illustrated in FIG. 2(a), FIG. 2(b) and FIG. 2(c), the column assembly (209) is configured to move in upward and downward directions as per the need of the surgical procedure. The set-up joint assembly (211), the telescopic column assembly (213) and the parallelogram arm assembly (215) moves in upward and downward direction with movement of the column assembly (209). FIG. 2(c) illustrates the robotic arm assembly (215) in which the set-up joint assembly (211) is in fully extended position to show the maximum reach of the robotic cart assembly (200). The telescopic column assembly (213) is configured to move in vertical directions to facilitate docking of the surgical instruments to a desired position during the surgical procedures. The movement of the set-up joints (211) and the telescopic column assembly (213) may be controlled by a separate switch provided on the robotic arm assembly (215).

Figure 3A:
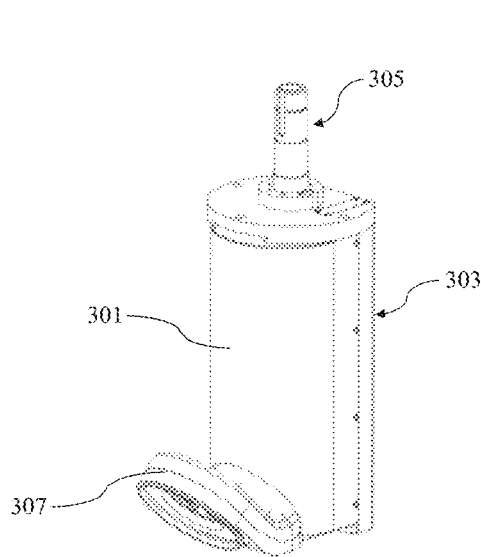
FIG. 3(*a*) illustrates a perspective view of a telescopic column assembly in accordance with an embodiment of the disclosure.
Figure 3B:
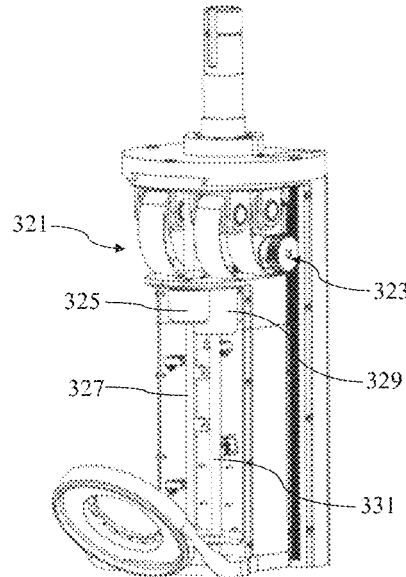
Figure 4A:
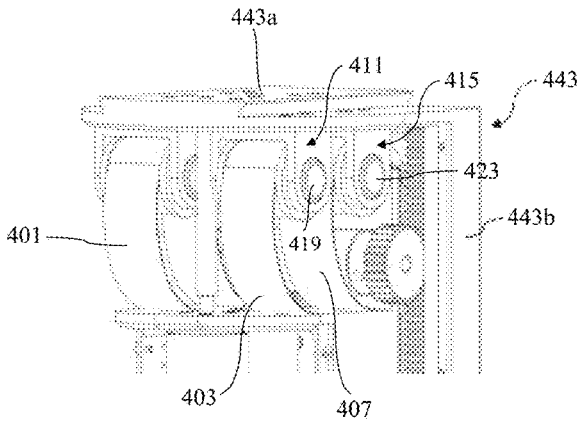
FIG. 4(*a*) illustrates a spring assembly of the telescopic column assembly in accordance with an embodiment of the disclosure.
Figure 4B:
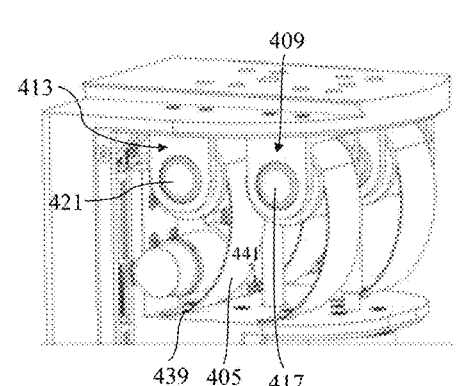
Figure 4B:
Figure 4C:
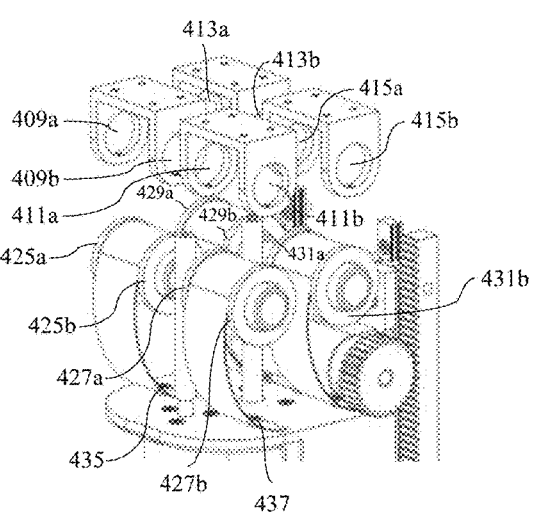
Figure 4D:
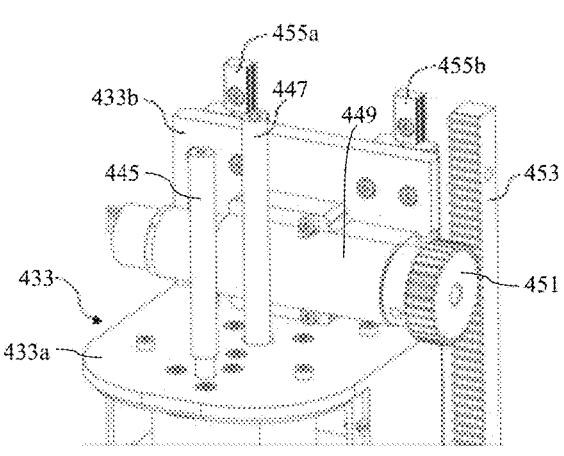

FIG. 3(a) illustrates a perspective view of a telescopic column assembly in accordance with an embodiment of the disclosure and FIG. 3(b) illustrates a perspective view of the telescopic column assembly without a housing in accordance with an embodiment of the disclosure. The telescopic column assembly (213) as illustrated in FIG. 3(a) may include a housing (301), a support member (303), a dovetail clamp (305) and a mounting member (307). The dovetail clamp (305) is a secured to one end of the support member (303) and other end of the dovetail clamp (305) is secured to one end of the set-up joint assembly (211) (as shown in FIG. 2(c)). The telescopic column assembly (213) as illustrated in FIG. 3(b) may include a plurality of spring assemblies (321) mounted/positioned at one end of the support member (303), a rack and pinion assembly (323), a position sensor (325), a position sensor shaft (327), a brake (329) and a brake shaft (331). The details of the aforesaid components of the telescopic column assembly (213) are explained in the description of accompanying drawings.

FIG. 4(a), FIG. 4(b), FIG. 4(c) and FIG. 4(d) illustrates a spring assembly and a rack and pinion assembly of the telescopic column assembly (213). The telescopic column assembly (213) is configured to move in upward and downward directions. In one implementation, the spring assembly may include a plurality of springs (401), (403), (405) and (407) is secured to a plurality of bracket assembly (409), (411), (413), (415) respectively. The plurality of springs (401), (403), (405) and (407) may be a constant spring and the like. Further, the plurality of springs (401), (403), (405) and (407) are wrapped on a plurality of drums (417), (419), (421) and (423) respectively. The plurality of drums (417), (419), (421) and (423) are rotatably coupled to the plurality of (409), (411), (413), (415). The plurality of bracket assembly (409), (411), (413), (415) includes recess at each end. For example, the bracket (409) comprises a recess (409a) (409b), the bracket (411) comprises a recess (411a) (411b), the bracket (413) comprises a recess (413a) (413b) and the bracket (415) comprises a recess (415a) (415b). Further, the plurality of bracket assembly (409), (411), (413), (415) at its each ends, includes a washer in between the recess and the drum. For example, a washer (425a) is arranged between the recess (409a) and one end of the drum (417), and a washer (425b) is arranged between the recess (409b) and other end of the drum (417). A washer (427a) is arranged between the recess (411a) and one end of the drum (419), and a washer (427b) is arranged between the recess (411b) and other end of the drum (419). A washer (429a) is arranged between the recess (413a) and one end of the drum (421), and a washer (429b) is arranged between the recess (413b) and other end of the drum (421). A washer (431a) is arranged between the recess (415a) and one end of the drum (423), and a washer (431b) is arranged between the recess (415b) and other end of the drum (423).

In an embodiment, one end of the plurality of spring (401), (403), (405) and (407) are wrapped to the plurality of drums (417), (419), (421) and (423) respectively and other end of the plurality of springs (401), (403), (405) and (407) are secured to a horizontal profile (433a) of the support member (433). Accordingly, the other end of the spring (401) is secured to the horizontal profile (433a) of the support member (433) by a securing means (435). The other end of the spring (403) is secured to the horizontal profile (433a) of the support member (433) by a securing means (437). The other end of the spring (405) is secured to the horizontal profile (433a) of the support member (433) by a securing means (439). The other end of the spring (407) is secured to the horizontal profile (433a) of the support member (433) by a securing means (441).

In an embodiment, one end of the plurality of bracket assembly (409), (411), (413), (415) is secured to a horizontal profile (443a) of a support member (443). A motor (449) is horizontally secured to a vertical profile (433b) of the support member (433). A pinion (451) is operationally secured to one end of the motor (449). A rack (453) is secured to a vertical profile (443b) of the support member (443). The rack (453) is operationally configured to the pinion (451) so as to provide a linear upward and downward movement of the spring assembly. The support member (433) is capable of moving in upward and downward direction facilitated by the motor (449) along with rack (451) and pinion (451) assembly.

In an embodiment, a linear guide rail (455a) and (455b), at its rear end, is secured to the vertical profile (443b) of the support member (443) and the front side of the liner guide rail (455a) and (455b) is secured to a rear side of the vertical profile (433b) of the support member (433) by plurality of mounting brackets. The working of linear guide rail (455a) and (455b) for facilitating the movement of the spring assembly along with the support member (433) in upward and downward direction is explained in the description of accompanying FIG. 5.

Figure 5:
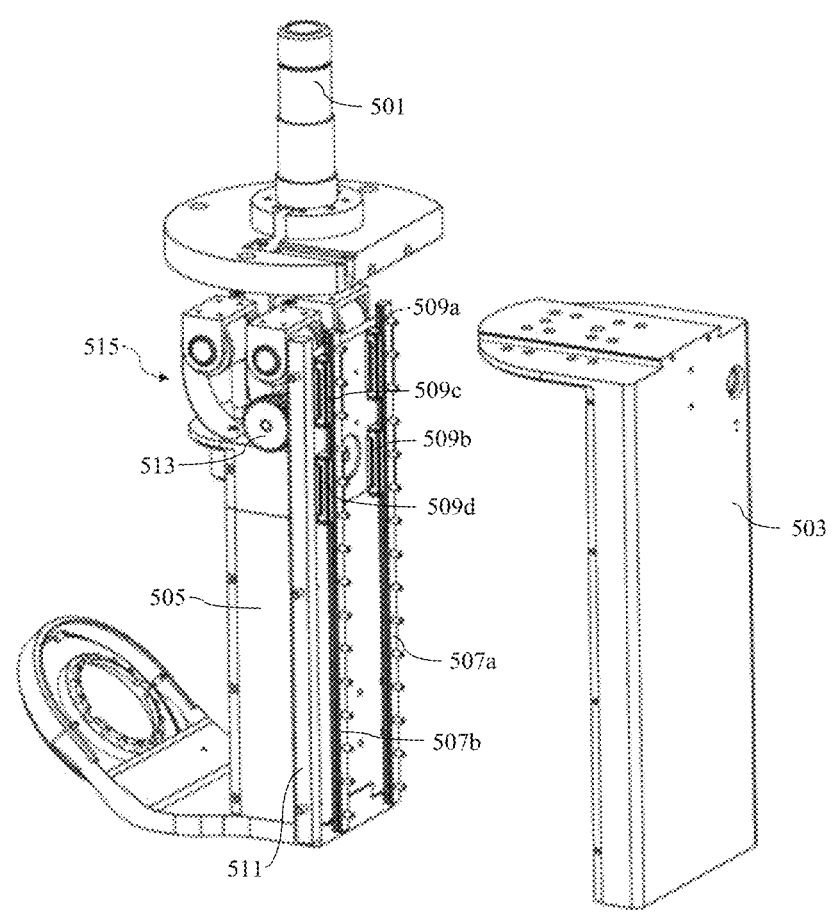
FIG. 5 illustrates an exploded view of the telescopic column assembly in accordance with an embodiment of the disclosure.

FIG. 5 illustrates an exploded view of the telescopic column assembly in accordance with an embodiment of the disclosure. A linear guide rail (507a) and (507b) are secured to a support member (503) at its one side, facilitated by a plurality of mounting brackets (509*a*), (509*b*), (509*c*) and (509*d*) are secured to one end of the support member (505). The other side of the guide rail (507*a*) and (507*b*) is secured to a support member (505). The plurality of mounting brackets (509*a*), (509*b*), (509*c*) and (509*d*) are secured to one end of the support member (505). Also, a pinion (513) is operationally mounted on a rack (511) to facilitate the movement of the support member (505) in upward and downward direction.

The foregoing descriptions of exemplary embodiments of the present disclosure have been presented for purposes of illustration and description. They are not intended to be exhaustive or to limit the disclosure to the precise forms disclosed, and obviously many modifications and variations are possible in light of the above teaching. The exemplary embodiment was chosen and described in order to best explain the principles of the disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient but is intended to cover the application or implementation without departing from the spirit or scope of the claims of the present disclosure.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the apparatus in order to implement the inventive concept as taught herein.

We claim:

1. A telescopic column assembly (213), comprising:
a housing (301);
a dovetail clamp (305);
a support member (303);
a mounting member (307);
a plurality of spring (401), (403), (405), (407);
a plurality of plurality of bracket (409), (411), (413), (415);

a plurality of drum (417), (419), (421), (423) rotatably coupled to the plurality of bracket (409), (411), (413), (415);
a motor (449) secured to a vertical profile (433*b*);
a rack (453) and a pinion (451), wherein the pinion (451) is operationally secured to one end of the motor (449) and the rack (453) is secured to a vertical profile (443*b*);
a position sensor (325), wherein the position sensor (325) is secured to a position sensor shaft (327); and
a brake (329), wherein the brake (329) is secured to a brake shaft (331).

2. The telescopic column assembly (213) as claimed in claim 1, wherein the dovetail clamp (305) is a secured to one end of the support member (303) and other end of the dovetail clamp (305) is secured to one end of a set-up joint assembly (211).

3. The telescopic column assembly (213) as claimed in claim 1, wherein the bracket (409) comprises a recess (409*a*) (409*b*), the bracket (411) comprises a recess (411*a*) (411*b*), the bracket (413) comprises a recess (413*a*) (413*b*) and the bracket (415) comprises a recess (415*a*) (415*b*).

4. The telescopic column assembly (213) as claimed in claim 1, wherein one end of the plurality of springs (401), (403), (405), (407) is secured to the plurality of drum (417), (419), (421), (423) and other end of the plurality of springs (401), (403), (405), (407) is secured to a horizontal profile (433*a*).

5. The telescopic column assembly (213) as claimed in claim 1, wherein the plurality of springs (401), (403), (405) and (407) is configured to wrapped around the plurality of drum (417), (419), (421), (423) to facilitate movement of the telescopic column assembly (213) in upward and downward direction.

6. The telescopic column assembly (213) as claimed in claim 1, wherein the plurality of bracket assembly (409), (411), (413), (415) is secured to a horizontal profile (443*a*).

7. The telescopic column assembly (213) as claimed in claim 1, further comprising:
a linear guide rail (507*a*), (507*b*), wherein one end of the linear guide rail (507*a*), (507*b*) is secured to a support member (503) and the other end of the linear guide rail (507*a*) and (507*b*) is secured to a support member (505); and
a plurality of mounting bracket (509*a*), (509*b*), (509*c*), (509*d*) secured to one end of a support member (505).

* * * * *